Figure 1:
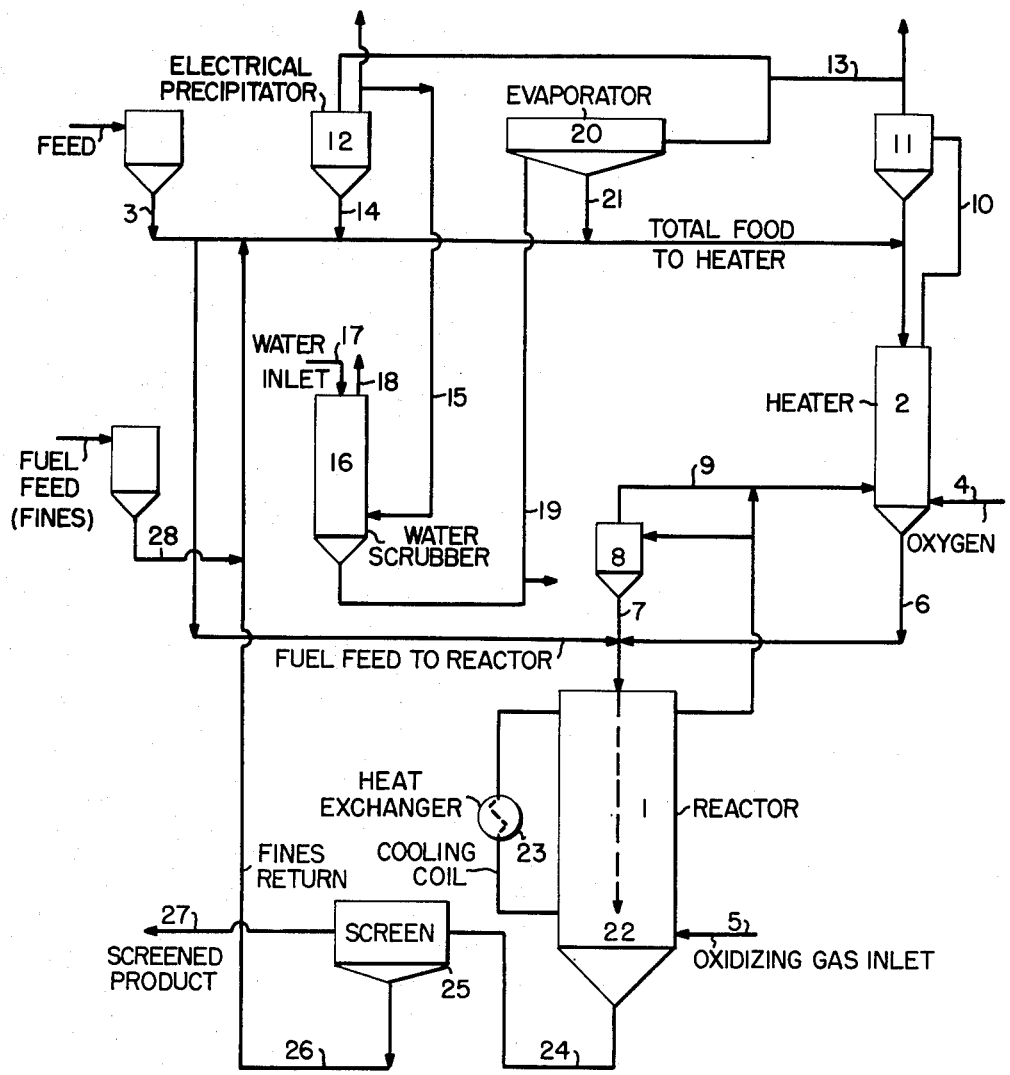

Dec. 7, 1965  R. B. MASON ETAL  3,222,412
CARBONACEOUS ADSORBENTS
Filed June 27, 1960  4 Sheets-Sheet 1

System For Preparation Of Adsorbents
From Carbonaceous Materials

Ralph Burgess Mason
Paul Earl Eberly, Jr.  Inventors

By *Richard H. Nagel*  Patent Attorney

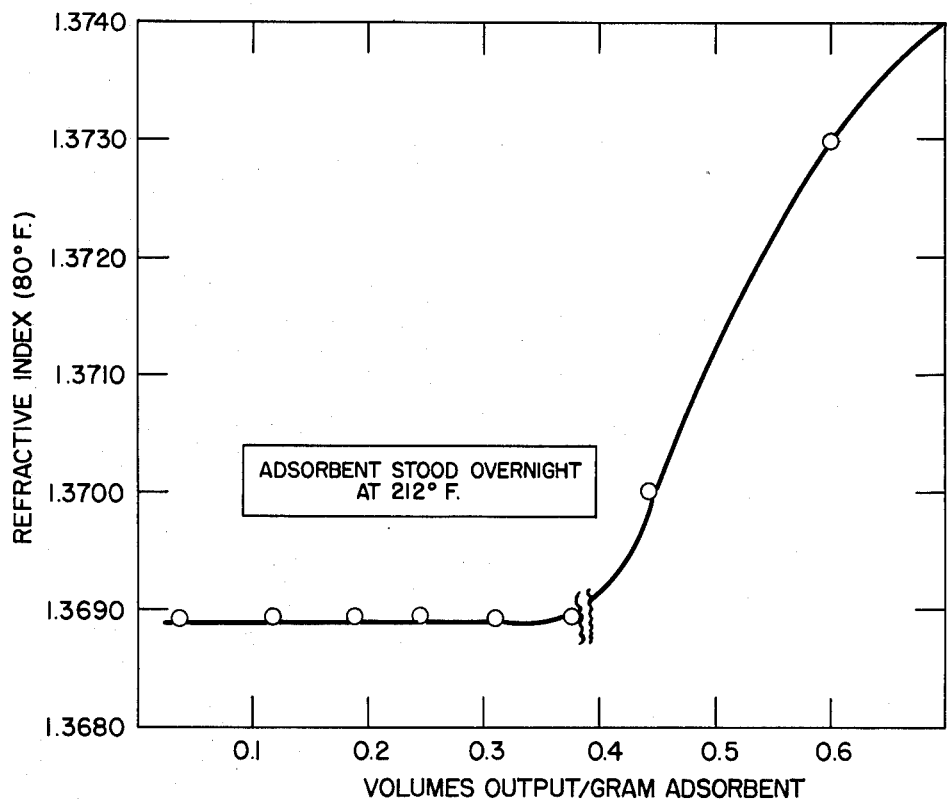

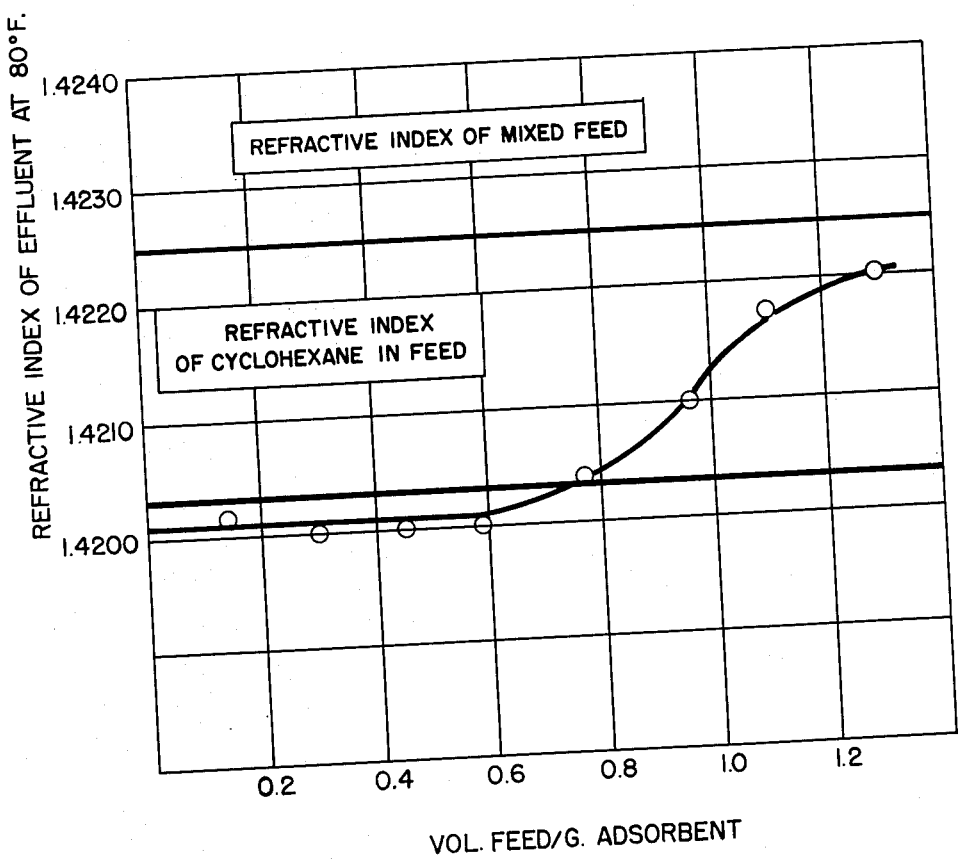

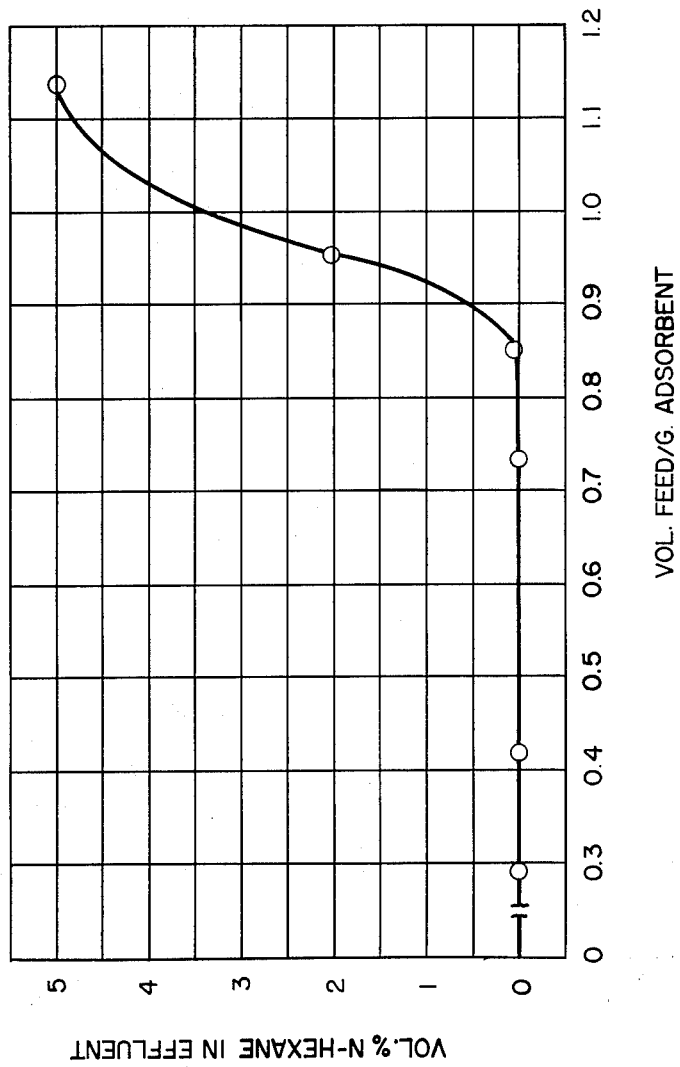

3,222,412
CARBONACEOUS ADSORBENTS
Ralph Burgess Mason, Denham Springs, and Paul Earl Eberly, Jr., Baton Rouge, La., assignors to Esso Research and Engineering Company, a corporation of Delaware
Filed June 27, 1960, Ser. No. 38,848
10 Claims. (Cl. 260—674)

This invention relates to a new and improved adsorbent and a method for making the same. More specifically, this invention teaches the treatment of carbonaceous materials such as coal, coke, and graphite, so as to improve their capacity and selectivity for certain hydrocarbon materials.

It has long been a problem in the petroleum industry to separate various hydrocarbon types. This is necessary because certain types of hydrocarbons are uniquely suitable for one purpose, while others are not. Many techniques in the past have been devised for separating these materials. For example, distillation may be used to separate hydrocarbons which have different boiling points. However, distillation is quite expensive and is of little value in separating materials boiling in approximately the same range. To separate materials having similar boiling points, adsorption is commonly used. The adsorbent preferably selects or rejects the particular type of hydrocarbon sought. There are many adsorbents well known in the prior art. For example, 5A molecular sieves have been used to separate branched chain from straight chain hydrocarbons. This separation can be brought about since the smaller molecular dimensions of the straight chain hydrocarbon permit it to enter uniform pore openings of the sieve structure. The branch chained hydrocarbons, on the other hand, are too large to enter the pores and are therefore rejected. In the case of 13X molecular sieves, the selectivity is primarily dependent on the polar or polarizable properties of the various hydrocarbons. For example, in a mixture containing olefinic, aromatic, and paraffinic hydrocarbons, the polar and polarizable olefins and aromatics will preferentially cling to the adsorbent, and the paraffinic hydrocarbons which are nonpolar will be rejected. These molecular sieves, however, have many significant drawbacks. Firstly, they are quite expensive, selling for about $1/lb. Secondly, they tend to polymerize olefins which may be present in the feed stream resulting in considerable contamination of the sieve and the loss of valuable material. A third drawback of molecular sieves is their inherent weakness making them unsuitable for fluidized operation. Fluidized operation is advantageous in that it may be adapted to a truly continuous process.

Adsorptive properties have in the past been recognized in numerous carbonaceous materials. For example, activated carbon has a high adsorptive capacity for hydrocarbons. They are, however, comparatively nonselective and therefore of little use for hydrocarbon separations.

In accordance with the instant invention, it has been found that certain carbonaceous materials such as coal, coke, and graphite, can be pretreated in such a manner that a useful, selective adsorbent for hydrocarbons can be produced. The adsorbents thus produced are of the extremely low cost one to two cents per pound, do not polymerize olefinic material, and have sufficient strength to be used in a fluidized process.

The particular pretreatment used is dependent upon the particular separative properties desired. When it is desirable to separate straight chain hydrocarbons from other hydrocarbons such as branch chained and cyclic compounds, it has been discovered in accordance with this invention that a pretreatment with an inert gas such as hydrogen is effective in increasing the selectivity of carbonaceous materials. The inert gas is introduced into contact with the carbonaceous material at elevated temperatures of 850° to 2000° F., preferably from 1100° to 1600° F., for a period of from 0.5 to 8 hours. The treatment is performed at pressures in the range of from 0.5 to 4 atm. The inert gases which may be used in the process include nitrogen, helium, ammonia, methane, carbon monoxide, carbon dioxide, halomethanes and halogen gases. In addition, hydrides of the halogen elements and higher molecular weight hydrocarbons such as ethane, propane, butane, ethylene, propylene, and butylene may be used. Also, increased capacity and selectivity can be obtained in the absence of a stripping gas by heating in the previously mentioned temperature range under reduced pressures even less than 0.5 atm.

In another embodiment of the instant invention, it has been found that special properties permitting separation of naphtha hydrocarbons may be obtained by the low temperature, fluidized solids oxidation of anthracite coal, bituminous coal, and other carbonaceous material. After going through this pretreatment, the oxidized coal has the peculiar property of rejecting branched chain hydrocarbons and, in particular, the doubly branch chained materials which are characterized by their very high octane number. This particular property affords a means of separating these valuable antiknock compounds and producing a valuable motor fuel having a very high blending octane value. In this embodiment of the invention, coal is subject to oxidation with an oxygen-containing gas at temperatures of from 500° to 850° F., at pressures of from 0.5 to 5 atm. Preferred partial pressure range of oxygen is atmospheric or less. This mild oxidation results in yields of from 30 to 90 weight percent of adsorbent based upon charge.

To further clarify the instant invention, attention is directed to the attached FIGURE 1 which shows an improved process for oxidizing carbonaceous material wherein the fines produced during sizing or extraneous fines are used to provide the heat needed in the process.

The apparatus used in the process consists primarily of a reactor 1 and an auxiliary heater 2. The untreated coal or coke is introduced into line 3 and passes into the top of the heater 2. Auxiliary air and/or oxygen is fed into the heater 2 through line 4. Similarly, air or oxidizing gas is fed into the reactor 1 through line 5. The system is brought under appropriate temperature conditions by preheating the oxidizing gases by any convenient means such as a fired coil. Thereafter, these gases are either heated by heat exchangers in the system (not shown) or are fed directly to the reactor at room temperature. The heater is maintained at a temperature substantially higher than that of the reactor by burning fines and a necessary amount of the feed so that sufficient heat is transferred to the reactor via the dip leg 6 to maintain a temperature in the range of 500 to 800° F. The fines and the exit gases leave the reactor through line 7 and enter cyclone separator 8. Those fines not readily settled by the cyclone separator on the reactor are passed together with the exit gases to the heater 2 through line 9, where with auxiliary combustion, oxidation of the fines is continued as a source of heat. The fines from the heater may be vented to the atmosphere. However, this creates a nuisance factor and also results in the loss of a small amount of heat. Hence, the fines and the exit gas leave the heater through line 10 and are passed to cyclone separator 11. The exit gas from the cyclone separator 11 is then passed along with a small amount of fines to the electric precipitator 12 through line 13. The precipitated fines are removed from the electric precipitator wherein they rejoin the feed to the heater. The gas removed from the electric precipitator which still contains a small amount of fines is then fed through line 15 to water scrubber 16. Water is introduced into the scrubber through line 17. The exit gas is vented from the water scrubber now substantially completely free of fines through line 18. The water solution from the scrubber which contains a small amount of fines is fed through line 19 to evaporator 20 wherein the water present is evaporated. The dried fines are then passed through line 21 into the feed stream 3 to provide additional heat in the process. Returning now to the reactor, the temperature therein may be carefully controlled by the use of a cooling coil 22, which is connected to heat exchanger 23. The treated carbonaceous material is removed from the reaction 1 through line 24 and passed to the screening unit 25. The screen in this unit is adjusted to the desired particle size. Generally, particles smaller than 100 mesh present difficulty in fluidized solids operation, and it is therefore desirable to remove fines of a leser dimension. The adsorbent fines in the range of 100 mesh and finer are removed from the finished adsorber through line 26 and recirculated back to line 3 wherein they are reused in the heater 2. The desired product is removed through line 27. In many instances, it may be desirable to introduce fuel fines of a type different from those produced in the instant process. These fines are introduced into the total feed to the heater 2. This permits the use of inexpensive fines such as those obtained from bituminous material. By utilizing the low temperature oxidation technique described above, the carbonaceous material can be made to reject doubly branched hydrocarbons, while it will adsorb singly branched, normal and aromatic hydrocarbons. In addition to the doubly branched hydrocarbons, naphthenes, i.e. cyclic hydrocarbons, are also rejected. This proerty of the adsorbent suggests that the openings in the oxidized carbonaceous material are elliptical or rectangular in shape such as would result from a layer configuration of the carbon atoms. This permits the adsorption of a chain or planar configuration, but prevents the adsorption of those molecules of 3-dimensional structures.

This property of the oxidized carbonaceous material makes it uniquely applicable for many petroluem processes. For example, the products from isomerization of $C_5$-$C_7$ hydrocarbons contain n-paraffins, singly branched paraffins and multiply branched paraffins such as triptane, 2,2-methyl ethyl butane, 2,3-methyl ethyl butane, 2,2-dimethyl butane, and 2,3-dimethyl butane, neopentane, and the like. This mixture may then be contacted with the adsorbent to adsorb the low octane components such as the normal and singly branched paraffins from the above-mentioned multiply branched high octane components. The superior hydrocarbons not adsorbed are segregated for use in super fuels. The adsorbed materials may be stripped from the adsorbent with an inert gas, steam and/or elevated temperatures and returned together with fractions not contacted with the adsorbent to the isomerization process. Thus, eventually an entire naphtha stream may be converted to the desired high octane level.

Another application wherein the oxidized carbonaceous material is uniquely suitably is in hydroforming and powerforming. Since the adsorbent permits the adsorption of planar, but rejects molecules of 3-dimensional configuration, it is now possible to separate naphthene hydrocarbons such as cyclohexane from aromatics, i.e. benzene, toluene, and the like. The naphthenic cyclohexane is known to exist in a 3-dimensional configuration, whereas aromatics exist as a plane. The desired separation of aromatics and naphthenes is best performed in vapor phase contacting at temperatures sufficient to maintain the normal vapor state. Pressures usually are at atmospheric or slightly reduced, ranging from 200 to 760 mm. Hg. A particular adaptation of the operation consists in adsorption of all aromatics from powerformer and hydroformer feed stocks and products. It is desirable to remove aromatics from the feed so that the dehydrogenation of naphthenes to produce aromatics is not hampered by the latter being present. That is, a greater conversion can be obtained at a given set of conditions. The removal of aromatics from the product stream permits the recycling of the unconverted naphthenes. The overall effect of using the adsorbent described in this invention is that less drastic conditions and thus prolonged catalyst life can be obtained.

In still another embodiment of this invention, it has been discovered that by treating the carbonaceous material which has been oxidized at low temperatures, the adsorbent may be conditioned to reject all branched paraffin isomers, while adsorbing normal paraffins and aromatics. This end is realized by treating with a polar compound such as water or an aqueous solution of a volatile electrolyte followed by drying in the range of 400 to 1000° F. Examples of the volatile electrolyte which may be used are ammonium chloride, hydrogen chloride, ammonium hydroxide, acetic acid, formic acid, and the like. When extraction with water is employed, the temperatures should be in the range of from 200 to 212° F. The drying at 400 to 1000° F. is performed in an inert atmosphere.

In still another embodiment of the instant invention, it has been found that adsorbents from low temperature oxidation of coals and the like are rendered more "sieve-like" (i.e., given greater capacity at low pressures of adsorbate) by treating in a nonoxidizing atmosphere at temperatures in the range of 1200 to 3000° F. Higher temperatures may be employed, but difficulty in achieving such extreme temperatures renders their use of little economic value. The temperatures in excess of 1500° F. are best achieved with electric conductance heating. The nonoxidizing gases include hydrogen, nitrogen, helium, argon, ammonia, carbon dioxide, and the like.

The instant invention is applicable to the separation of hydrocarbons over a wide boiling range, for example, light and heavy naphtha fractions and middle distillates such as kerosene and diesel fuel. Particular conditions for adsorption vary with the feed stock employed. Though both liquid and vapor phase operation may be employed, vapor phase operation is preferred. Most preferred are temperatures just sufficient to maintain the feed stock in vapor phase, i.e. the temperature should be from 5 to 20° F. above the boiling point of the feed at the particular adsorption pressure. The adsorption pressure may be from about 0.1 atm. to atmospheric pressure, with the latter pressure being most desirable.

The following examples are given to further illustrate the advantages of the instant invention:

*Example 1*

Raw anthracite coal has only a limited adsorption capacity for hydrocarbons; however, it has an inherent selectivity for separating low molecular weight n-paraffins from branched paraffins. The capacity of the raw coal for n-paraffins is increased tremendously by pretreating the coal with a stripping gas such as hydrogen at elevated temperatures prior to the adsorption experiment. Data are shown in the following tabulation.

TABLE A

| Adsorbent | Wt. percent Adsorbed at 0° C. and 350 mm. Hg | |
|---|---|---|
| | n-Butane | Isobutane |
| Raw anthracite | 0.5 | 0 |
| Anthracite stripped with $H_2$ at 1,200° F. for 4 hrs | 3.0 | 0.005 |

The results show that the n-butane capacity is increased six-fold by the hydrogen pretreatment. The isobutane capacity remains almost negligible.

*Example 2*

To show the improved adsorptive selectivity of anthracite coal for naphtha hydrocarbons by pretreating with inert gas in accordance with the instant invention, fixed beds of anthracite were treated. The following table shows the inert gas used, the treating conditions and the effect on the adsorptive capacity for straight chain and branch chain hydrocarbons.

TABLE B

| Run No. | Pretreatment | | | Adsorptive Capacity at 200° F. and 300 mm. Hg—liquid cc./gm. | |
|---|---|---|---|---|---|
| | Treating Gas | Temp., °F. | Hrs. | n-C$_6$ | 2-MeC$_5$ |
| 0081 | Untreated | | | Nil | Nil |
| | Hydrogen | 1,600 | 4 | 0.009 | |
| 0071 | Hydrogen | 1,200 | 4 | 0.01 | Nil |
| 0078 | Nitrogen | 1,200 | 4 | 0.007 | Nil |

These data show that the pretreatment develops some capacity for straight-chain hydrocarbons. The branched-chained compounds still remain unadsorbed. While nitrogen treat has some effect, it is not as advantageous as the treatment with the hydrogen.

*Example 3*

Treatment of anthracite and bituminous coal with an oxygen-containing gas results in improved capacity and selectivity for the coal. This is shown in the following table:

TABLE C

| | Run No. | Fluidized Solids Air Oxidation at 500 v./v./hr. | | | Adsorptive Capacity at 200° F. and 300 mm. Hg—liquid cc./gm. | | |
|---|---|---|---|---|---|---|---|
| | | Temp., °F. | Hrs. | Yield, Wt. Percent | n-C$_6$ | 2-Me Pentane | Toluene |
| Anthracite | 0094 | 650 | 12 | 80 | 0.01 | Nil | |
| | 0095 | 750 | 7.5 | 78 | 0.08 | 0.05 | 0.11 |
| | 0101 | 750 | 16.5 | 54 | 0.1 | | 0.12 |
| Bituminous | Untreated | | | | Nil | | Nil |
| | 0111 | 750 | 6 | 46 | 0.11 | | 0.13 |

The above data show conclusively that air oxidation results in improved adsorptive capacity of both anthracite and bituminous coal. The treatment of anthracite at 650° F. resulted in about the same improvement as the hydrogen treat shown in the previous example. It should be noted that at the higher temperature of 750° F. the capacity of the anthracite increased markedly, but the selectivity feature of adsorbing normal paraffins and rejecting branched chain and aromatic hydrocarbons was lost. The results obtained with the bituminous coal upon air oxidation at 750° F. are similar to that obtained with the anthracite; however, the capacity is slightly higher.

*Example 4*

To show the application of the improved adsorbent of the instant invention to the separation of various type hydrocarbon streams, experiments were performed with pure samples of individual hydrocarbons. The following table shows the amount of material adsorbed.

TABLE D

ADSORPTION BY ANTHRACITE COAL AIR OXIDIZED @ 750° F.

[Test at 200° F.: 300 mm. Hg pressure]

| Hydrocarbon: | Capacity, Liquid cc./gm. |
|---|---|
| Toluene | 0.12 |
| n-Hexane | 0.08 |
| 2-methyl pentane | 0.05 |
| 2,2-dimethyl butane | Nil |

These data show the suitability of using the oxidized anthracite coal in a naphtha isomerization process. The isomerate may first be segregated into narrow boiling fractions, preferably those containing a greater preponderance of hydrocarbons such as triptane, 2,2-methyl ethyl butane, 2,3-methyl ethyl butane, 2,2-dimethyl butane, 2,3-dimethyl butane, and neopentane. These doubly branched hydrocarbons, as can be seen from the above data, are not adsorbed by the special adsorbent and thereby a stream of exceptionally high octane components is rejected.

*Example 5*

Excessive oxidation of coal results in the production of an adsorbent which shows some adsorption of doubly branched paraffins, thereby reducing the selectivity of the adsorbent when it is desirable to reject such compounds. To counteract the effect of this prolonged oxidation, the oxidized carbonaceous material may be treated with polar compounds such as water or an aqueous solution of a volatile electrolyte followed by drying at temperature ranges between 400 and 1000° F. In addition, this treatment also serves to modify the adsorbent so that it will adsorb aromatics and normal paraffins and reject all branched chain paraffins (both singly and doubly branched). To show the efficacy of this process, two sets of experiments were performed.

In one a sample adsorbent, which was typical of one from anthracite coal oxidized to the point of being non-selective (high capacity for 2-methyl pentane), was refluxed with ammonium chloride solution. Quantities involved were: 15 grams of ammonium chloride in 91 grams of water and 10 grams of the oxidized adsorbent. The recovery of the dried product was 9.6 grams. This is experiment A in the following tabulation. In the second test a 10 gram portion of the same adsorbent was refluxed for two-hour periods successively with 122, 110, and 124 grams of distilled water. The liquid for each extraction was removed by filtration before addition of the water for the subsequent step. This is experiment B in the following table which shows the effect of these treatments.

TABLE E

| Experiment | Original Adsorbent | NH₄Cl, A | Water, B |
|---|---|---|---|
| Identification No. CK-0 | 101 | 113 | 115 |
| Drying Temp., °F | | 1,000 | 750 |
| Hours of Drying | | 2 | 2 |
| Adsorptive Capacity at 200° F. and 300 mm. Hg, liquid cc./gm.: | | | |
| Toluene | 0.12 | 0.08 | 0.06 |
| n-Hexane | 0.08 | 0.03 | 0.04 |
| 2-methyl-pentane | 0.04 | nil | nil |
| 2,2-dimethyl butane | nil | nil | nil |
| 2,3-dimethyl butane | 0.01 | nil | nil |

Both experiments A and B demonstrate the feasibility of the process by showing complete rejection of the branched paraffins.

Example 6

That the oxidized adsorbent of this invention may be made more "sieve-like" (i.e., greater capacity at low pressures of adsorbate) by heating in a nonoxidizing atmosphere at temperatures in the range of 1200 to 3000° F. is shown in the table below.

TABLE F
ADSORPTIVE CAPACITIES FOR TREATED ANTHRACITE COAL

| Sample, CK- | 0095 | | | | | | 101 | | | | | |
|---|---|---|---|---|---|---|---|---|---|---|---|---|
| Oxidation Temp., °F | 750 | | | | | | 750 | | | | | |
| Hours Oxidation | 7.5 | | | | | | 16 | | | | | |
| Wt. Percent Yield | 78 | | | | | | 46 | | | | | |
| Subsequent Treatment | None | | | H₂ | | | None | | | H₂ | | |
| Hours | | | | 1 | | | | | | 6 | | |
| Temp., °F | | | | 1,200 | | | | | | 1,600 | | |
| Adsorptive Capacity, | Total | Sieve-Like [2] | Ratio | Total | Sieve-Like | Ratio | Total | Sieve-Like | Ratio | Total | Sieve-Like | Ratio |
| Liquid cc./gm.:[1] | | | | | | | | | | | | |
| Toluene | 0.11 | 0.05 | 2.2 | 0.07 | 0.04 | 1.75 | 0.12 | 0.03 | 4.0 | 0.11 | 0.04 | 2.8 |
| n-Hexane | 0.07 | 0.027 | 2.6 | 0.05 | 0.02 | 2.5 | 0.078 | 0.015 | 5.2 | 0.088 | 0.03 | 2.9 |
| 2,2-dimethyl butane | 0 | 0 | | 0 | 0 | | 0.003 | 0.002 | 1.5 | 0 | 0 | |
| Pressure Effect, Liquid cc./gm./mm./Hg (200–300 mm. Hg Ranges): | | | | | | | | | | | | |
| Toluene | 0.00004 | | | 0.00002 | | | 0.00015 | | | 0.000065 | | |
| n-Hexane | 0.00003 | | | 0.00002 | | | 0.000075 | | | 0.0006 | | |
| 2,2-dimethyl butane | 0 | | | 0 | | | 0 | | | 0 | | |

[1] At 200° F. and 300 mm. Hg.
[2] Sieve-like adsorption is defined as the amount adsorbed at a pressure less than 1 mm. Hg.

Data illustrating the effect of heating oxidized samples of anthracite coal are presented in the attached Table E. The first sample showed some resemblance to 13X sieve and about half of its total capacity for aromatic hydrocarbons was of the desired sieve-like feature. The other sample oxidized for a longer period of time and with poorer temperature control was not as acceptable although the total capacity was about the same. Adsorptive features before and after treating with hydrogen are shown above.

The effect of hydrogen treatment in each case was to reduce the effective size of the pore to make the adsorbent more sieve-like. With the adsorbent CK-0095, this was accompanied with a decrease in capacity for both toluene and n-hexane. Adsorbent CK-0101 reacted somewhat similarly. The larger pores (more extensive oxidation) were shrunk so as to diminish the capacity for the large, planar aromatic molecule and the three-dimensional, doubly branched paraffin whereas the capacity for the straight chain paraffin increased slightly. It is to be noted, however, that the post heating rendered both samples more sieve-like. This is demonstrated by the diminished slope, cc./gm./mm. Hg and the ratio, total/sieve-like adsorption. From the foregoing discussion this ratio would be 1 when all the adsorption is sieve-like and the above data show that considerable progress has been made in this direction.

Example 7

In order to show the existence of optimum temperatures during the low temperature oxidation, oxidation was carried out at 650, 750, and 850° F. The comparative adsorptive capacity of toluene, normal hexane, and 2-methyl pentane is shown in the following table.

TABLE G
Anthracite coal fluidized with air at 400–800 v./v./hr. adsorption capacity at 200° F. and 300 mm. Hg

| Temperature, °F | Untreated | 650 | 750 | 850 |
|---|---|---|---|---|
| Hours | | 12 | 7.5 | 5.5 |
| Wt. Percent Yield | 100 | 80 | 78 | 70 |
| Surface Area, M.²/g | 0 | 14 | 194 | 0.0 |
| Adsorptive Capacity, Liquid cc./gm.: | | | | |
| Toluene | Nil | 0.04 | 0.11 | Nil |
| n-Hexane | Nil | 0.01 | 0.08 | Nil |
| 2-Methyl pentane | Nil | Nil | 0.05 | Nil |

These data show that an optimum temperature exists between 650 and 850° for total capacity and desired selectivity. It should be noted that the coal oxidized at 650 will separate normal hexane from 2-methyl pentane but will not separate normal hexane from toluene. Both the sample at 650 and 750 have a greater capacity for aromatics than for normal paraffins. This shows that oxidized anthracite may be used much in the same sense as a 13X molecular sieve is employed to remove aromatics from other hydrocarbons.

Example 8

The efficacy of the oxidized anthracite in removing aromatics from other hydrocarbons has been demonstrated in an experiment in which a synthetic blend of 5 volume percent benzene in normal hexane was passed over a bed of anthracite oxidized at 750° F. The adsorption was at 212° F., atmospheric pressure, and at a fed rate of 0.15 v./v./hour. The extent of the adsorption was determined by refractive indices during the progress of the experiment. The complete removal of benzene up to a capacity 0.4 liquid volume is demonstrated in FIGURE 2. Thus, a separation is achieved even though adsorbents of this type have capacity for both the aromatic and paraffin components of the feed.

Example 9

The adsorption of aromatics and rejection of naphthenes has been presented in the foregoing examples on the basis of capacity data. This is demonstrated in an experiment in which 5 volume percent benzene in cyclohexane was passed over a fixed bed of anthracite oxidized at 750° F. As in Example 8, the progress of the experiment was followed by refractive index data. The data are presented in FIGURE 3 and complete removal of benzene up to a capacity of 0.6 volume feed per gram of adsorbent has been reached. This performance is by the direct sieving action resulting from the peculiar properties of the adsorbent and no other sieve is known which will effect this separation by direct sieving.

*Example 10*

Direct sieving also is demonstrated in the separation of normal hexane from 2,2-dimethyl butane. This has been shown possible from capacity data and is proven in an experiment in which a feed containing 5 volume percent of n-hexane in 2,2-dimethyl butane was passed over a bed of anthracite oxidized at 750° F. The progress of the test was followed by gas chromatographic analyses of samples withdrawn at intervals. The data are presented in FIGURE 4. Complete separation was effected up to the capacity of 0.85 volume of feed per gram of adsorbent. The oxidized anthracite in this instance effects a separation by sieving that is achieved only with 5A zeolite material.

What we claim is:

1. An improved process for separating three-dimensional hydrocarbon molecules comprising doubly branched chain and naphthenic hydrocarbons from a feed containing other hydrocrabon types, said other hydrocarbon types comprising singly branched hydrocarbons, straight chain hydrocarbons, and aromatics which consists essentially of treating coal selected from the group consisting of anthracite bituminous with free oxygen containing gas at a temperature of about 650–850° F. and recovering 30–90 weight percent, based on said coal, of an adsorptive coal contacting said hydrocarbon feed with said adsorptive coal, which selectively excludes three-dimensional hydrocarbon molecules, in an adsorption zone absorbing said other hydrocarbon types and withdrawing from said adsorption zone a stream enriched in said three-dimensional hydrocarbons and depleted in said other hydrocarbon types.

2. The process of claim 1 wherein the oxygen treating step is carried out at a temperature of about 750° F.

3. An improved process for selectively separating aromatic hydrocarbons from naphthenes which consists essentially of oxidizing anthracite coal with a free oxygen containing gas at a temperature of about 750° F. thereby forming a selective adsorbent which separates aromatics from naphthene compounds, contacting a feed containing aromatics and naphthene compounds with said adsorbent in an adsorption zone, selectively adsorbing said aromatic hydrocarbons in said selective adsorbent and withdrawing a stream from said adsorption zone substantially enriched in naphthene hydrocarbons.

4. The process of claim 3 wherein said feed to said separation process is the product of a hydrocarbon hydroforming process.

5. The process of claim 3 wherein said feed to said separation process is the product of a hydrocarbon powerforming process.

6. An improved process for selectively separating aromatic and normal paraffin hydrocarbons from other types comprising singly and doubly branched paraffins which consist essentially of oxidizing coal selected from the group consisting of anthracite and bituminous with a free oxygen containing gas at a temperature of about 750 to 850° F., subsequently treating said thus treated coal with a polar compounds selected from the group consisting of water and an aqueous solution of a volatile electrolyte and drying said coal at a temperature of about 400 to 1000° F., thereby forming a selective adsorbent, contacting a feed containing aromatics, normal paraffins, singly and doubly branched paraffins with said adsorbent in an adsorption zone whereby said selective adsorbent in said adsorption zone selectively adsorbs said aromatics and said normal paraffins and selectively excludes said singly and doubly branched paraffins.

7. An improved process for selectively separating normal and singly branched hydrocarbons from doubly branched hydrocarbons which consists essentially of oxidizing coal selected from the group consisting of anthracite and bitmuinous with a free oxygen containing gas at a temperature of about 750° F. thereby forming a selective adsorbent which selectively excludes doubly branched hydrocarbons, contacting a feed containing normal, singly branched and doubly branched hydrocarbons with said adsorbent, and withdrawing a hydrocarbon stream substantially enriched in doubly branched hydrocarbons.

8. The process of claim 7 wherein the adsorbent is contacted with the reaction product of an isomerization reaction.

9. An improved process for the preparation of a selective adsorbent which consists essentially of: oxidizing a coal charge at a temperature between 650 and 850° F. wherein said coal is selected from the group consisting of anthracite and bituminous forming an oxidized product of 30 to 90 weight percent of said charge; contacting the said oxidized product with a polar compound selected from the group consisting of water and an aqueous solution of a volatile electrolyte; and drying said contacted oxidized product at a temperature between 400 and 1000° F. in an inert atmosphere, thereby producing an adsorbent selective of normal and aromatic hydrocarbons.

10. An improved process for preparing a selective adsorbent which consists essentially of partially oxidizing coal selected from the group consisting of anthracite and bituminous at a temperature of between 650° and 850° F. with a free oxygen-containing gas, contacting said oxidized product with a polar compound selected from the group consisting of water and an aqueous solution of a volatile electrolyte and drying said thus treated coal at a temperature between 400 and 1000° F. in an inert atmosphere.

References Cited by the Examiner

UNITED STATES PATENTS

| | | | |
|---|---|---|---|
| 2,008,144 | 7/1935 | Morrell | 252—445 |
| 2,008,146 | 7/1935 | Morrell | 252—445 |
| 2,037,257 | 4/1936 | Morrell | 252—445 |
| 2,162,366 | 6/1939 | Barker et al. | 252—445 |
| 2,162,763 | 6/1939 | Stuart | 252—445 |
| 2,312,707 | 3/1943 | Fuchs | 252—445 |
| 2,339,742 | 1/1944 | Fuchs | 252—445 |
| 2,556,859 | 6/1951 | Vesterdal | 252—445 |
| 2,571,936 | 10/1951 | Patterson et al. | 260—674 |
| 2,586,889 | 2/1952 | Vesterdal et al. | 252—445 |
| 2,721,184 | 10/1955 | Voorhies | 252—445 |
| 2,868,695 | 6/1959 | Shea | 252—445 |
| 2,894,914 | 7/1959 | Hassler et al. | 252—445 |

ALPHONSO D. SULLIVAN, *Primary Examiner.*

ABRAHAM RIMENS, *Examiner.*